(12) United States Patent
Mirmohammadi Ghoojdi et al.

(10) Patent No.: US 11,913,386 B2
(45) Date of Patent: Feb. 27, 2024

(54) FLUID CONTROL DEVICE FOR FLUID BLEED SYSTEM

(71) Applicant: Pratt & Whitney Canada Corp., Longueuil (CA)

(72) Inventors: Tahereh Mirmohammadi Ghoojdi, Longueuil (CA); Sid-Ali Meslioui, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/665,147

(22) Filed: Feb. 4, 2022

(65) Prior Publication Data

US 2023/0250763 A1 Aug. 10, 2023

(51) Int. Cl.
*F02C 9/18* (2006.01)
*F01D 17/10* (2006.01)
*F02K 3/06* (2006.01)

(52) U.S. Cl.
CPC .............. *F02C 9/18* (2013.01); *F01D 17/105* (2013.01); *F02K 3/06* (2013.01); *F05D 2220/32* (2013.01); *F05D 2240/12* (2013.01); *F05D 2260/606* (2013.01)

(58) Field of Classification Search
CPC .. F02C 9/18; F02C 6/08; F01D 17/105; F02K 3/06; F05D 2220/32; F05D 2240/12; F05D 2260/606
See application file for complete search history.

(56) References Cited

U.S. PATENT DOCUMENTS

| 4,203,566 | A | | 5/1980 | Lord | |
|---|---|---|---|---|---|
| 5,261,228 | A | * | 11/1993 | Shuba | F01D 17/105 60/226.3 |
| 6,050,527 | A | | 4/2000 | Hebert | |
| 8,024,935 | B2 | | 9/2011 | Hoover | |
| 10,502,132 | B2 | | 12/2019 | Guijarro Valencia | |
| 10,823,055 | B2 | | 11/2020 | Joshi | |
| 2008/0080967 | A1 | * | 4/2008 | Urbassik | F01D 11/14 415/116 |
| 2009/0288387 | A1 | | 11/2009 | Baltas | |
| 2010/0126182 | A1 | * | 5/2010 | Hoover | F02K 3/06 60/785 |
| 2011/0171006 | A1 | * | 7/2011 | Peters | F02C 6/08 137/15.1 |

(Continued)

OTHER PUBLICATIONS

EP search report for EP23155181.3 dated Jun. 2, 2023.

*Primary Examiner* — Todd E Manahan
*Assistant Examiner* — David P. Olynick
(74) *Attorney, Agent, or Firm* — Getz Balich LLC

(57) ABSTRACT

A gas turbine engine includes a bypass duct extending about a longitudinal centerline of the gas turbine engine. The bypass duct includes at least one bypass duct wall defining at least a portion of a bypass flow path through the bypass duct. The at least one bypass duct wall includes a scoop extending into the bypass flow path. The gas turbine engine further includes a bleed conduit including an inlet connected to the bypass duct within the scoop of the at least one bypass duct wall and at least one louver mounted to the bleed conduit within the inlet. The at least one louver extends between a leading edge and a trailing edge opposite the leading edge. The leading edge is located within the bypass flow path and the trailing edge is located within the bleed conduit.

16 Claims, 7 Drawing Sheets

(56) References Cited

U.S. PATENT DOCUMENTS

| | | | |
|---|---|---|---|
| 2012/0111011 A1* | 5/2012 | Pike | F02C 7/055 60/722 |
| 2015/0275757 A1 | 10/2015 | Turner | |
| 2017/0321602 A1* | 11/2017 | Guijarro Valencia | F02C 9/18 |
| 2018/0038279 A1* | 2/2018 | Joshi | F02C 6/08 |
| 2018/0195465 A1 | 7/2018 | Bruhat | |
| 2019/0338728 A1* | 11/2019 | Hussain | F02C 7/18 |

* cited by examiner

FLUID CONTROL DEVICE FOR FLUID BLEED SYSTEM

TECHNICAL FIELD

This disclosure relates generally to fluid systems for gas turbine engines, and more particularly to bleed systems which extract fluid from a duct of the gas turbine engine.

BACKGROUND OF THE ART

Gas turbine engines may conventionally include fluid bleed systems used to extract air and other fluids for use in one or more aircraft fluid systems. Extraction of the fluids from a fluid flow path of the gas turbine engine may be performed by a bleed conduit in fluid communication with a fluid duct, such as a bypass duct, which defines the fluid flow path. The bleed conduit may receive the fluid from an opening formed in the fluid duct. The bleed conduit may include one or more control valves used to control the flow of fluid through the bleed conduit.

In some cases, gas turbine engine bypass ducts have been found to generate unwanted noise, for example, sharp tonal-noise signatures, during operation of the associated gas turbine engine. The tonal noise may be produced when an associated control valve for the bleed conduit is in a shut or partially opened position. More specifically, the tonal noise may be caused, for example, by resonance and/or excitation vibration modes occurring either at the bleed conduit inlet or downstream of the bleed conduit inlet within the bypass duct. Accordingly, what is needed is an improved bleed system which addresses one or more of the above-noted tonal noise concerns without introducing significant aerodynamic losses within the fluid flow path and/or the bleed conduit.

SUMMARY

It should be understood that any or all of the features or embodiments described herein can be used or combined in any combination with each and every other feature or embodiment described herein unless expressly noted otherwise.

According to an aspect of the present disclosure, a gas turbine engine includes a bypass duct extending about a longitudinal centerline of the gas turbine engine. The bypass duct includes at least one bypass duct wall defining at least a portion of a bypass flow path through the bypass duct. The at least one bypass duct wall includes a scoop extending into the bypass flow path. The gas turbine engine further includes a bleed conduit including an inlet connected to the bypass duct within the scoop of the at least one bypass duct wall and at least one louver extending between a first lateral side and a second lateral side opposite the first lateral side. Each of the first lateral side and the second lateral side are mounted to the bleed conduit within the inlet. The at least one louver further extends between a leading edge and a trailing edge opposite the leading edge. The leading edge is located within the bypass flow path and the trailing edge is located within the bleed conduit.

In any of the aspects or embodiments described above and herein, the gas turbine engine may further include a bleed flow control valve disposed in the bleed conduit.

In any of the aspects or embodiments described above and herein, the scoop may include an upstream scoop portion located upstream of the inlet and a downstream scoop portion located downstream of the inlet. The upstream scoop portion may include a first upstream scoop end and the downstream scoop portion may include a second upstream scoop end.

In any of the aspects or embodiments described above and herein, the leading edge may be positioned substantially at an imaginary line intersecting the first upstream scoop end and the second upstream scoop end.

In any of the aspects or embodiments described above and herein, the at least one louver may extend at least one inch into the bypass flow path from inlet.

In any of the aspects or embodiments described above and herein, the at least one louver may include an upstream surface and a downstream surface. Each of the upstream surface and the downstream surface may extend from the leading edge to the trailing edge. The upstream surface may be a planar surface.

In any of the aspects or embodiments described above and herein, the at least one louver may include an upstream surface and a downstream surface. Each of the upstream surface and the downstream surface may extend from the leading edge to the trailing edge. The upstream surface may be a curved surface.

In any of the aspects or embodiments described above and herein, the first lateral end of the at least one louver may be mounted to the bleed conduit by a first rod and the second lateral end of the at least one louver may be mounted to the bleed conduit by a second rod.

In any of the aspects or embodiments described above and herein, the first rod and the second rod may be rotatable about a lateral rotation axis.

In any of the aspects or embodiments described above and herein, the gas turbine engine may further include an actuator connected to one or both of the first rod and the second rod and configured to rotate the at least one louver about the lateral rotation axis.

In any of the aspects or embodiments described above and herein, the at least one louver may include a plurality of louvers.

In any of the aspects or embodiments described above and herein, the leading edge of each louver of the at least one louver may be positioned substantially at an imaginary line intersecting the first upstream scoop end and the second upstream scoop end.

In any of the aspects or embodiments described above and herein, the louver may have a thickness which is greater than or equal to 0.1 inch (0.127 centimeter).

In any of the aspects or embodiments described above and herein, the gas turbine engine may further include a combustor, at least one compressor configured to drive air along a core flow path to the combustor, and a fan configured to drive air along the bypass flow path through the bypass duct. The core flow path may be located radially inward of the bypass flow path.

According to another aspect of the present disclosure, a gas turbine engine includes a duct including at least one duct wall defining at least a portion of a fluid flow path through the duct. The at least one duct wall includes a scoop extending into the fluid flow path. The gas turbine engine further includes a bleed conduit including an inlet connected to the duct within the scoop of the at least one duct wall and at least one louver extending between a first lateral side and a second lateral side opposite the first lateral side. Each of the first lateral side and the second lateral side are mounted to the bleed conduit within the inlet. The at least one louver further extends between a leading edge and a trailing edge opposite the leading edge. The leading edge is located within the fluid flow path and the trailing edge is located within the bleed conduit.

In any of the aspects or embodiments described above and herein, the scoop may include an upstream scoop portion located upstream of the inlet and a downstream scoop portion located downstream of the inlet. The upstream scoop portion may include a first upstream scoop end and the downstream scoop portion may include a second upstream scoop end.

In any of the aspects or embodiments described above and herein, the leading edge may be positioned substantially at an imaginary line intersecting the first upstream scoop end and the second upstream scoop end.

In any of the aspects or embodiments described above and herein, the at least one louver may include a plurality of louvers.

In any of the aspects or embodiments described above and herein, the leading edge of each louver of the at least one louver may be positioned substantially at an imaginary line intersecting the first upstream scoop end and the second upstream scoop end.

In any of the aspects or embodiments described above and herein, the gas turbine engine may further include a bleed flow control valve disposed in the bleed conduit.

The present disclosure, and all its aspects, embodiments and advantages associated therewith will become more readily apparent in view of the detailed description provided below, including the accompanying drawings.

DETAILED DESCRIPTION

Figure 1:
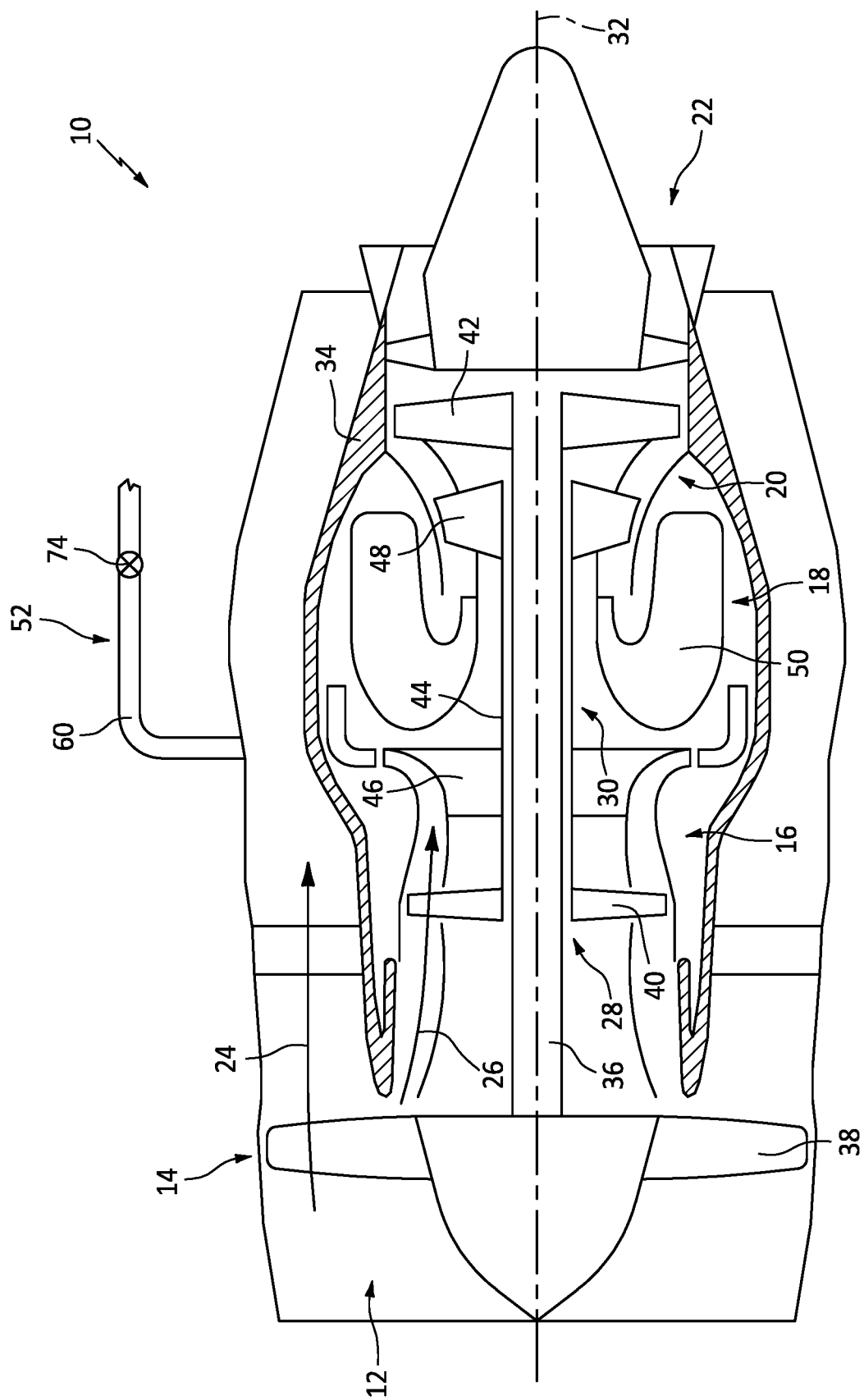
FIG. 1 illustrates a side schematic view of a gas turbine engine including a bleed system, in accordance with one or more embodiments of the present disclosure.

Referring to FIG. 1, an exemplary gas turbine engine 10 is schematically illustrated. The gas turbine engine 10 is disclosed herein as a two-spool turbofan engine that generally includes an inlet 12, a fan section 14, a compressor section 16, a combustor section 18, a turbine section 20, and an exhaust section 22. The fan section 14 drives air along a bypass flow path 24 while the compressor section 16 drives air along a core flow path 26 for compression and communication into the combustor section 18 and then expansion through the turbine section 20. Although depicted as a turbofan gas turbine engine in the disclosed non-limiting embodiments, it should be understood that the concepts described herein are not limited to use with turbofans as the teachings may be applied to other types of gas turbine engines including those with single-spool or three-spool architectures. Moreover, aspects of the present disclosure are not limited in application to gas turbine engines and may be applicable to other aircraft propulsion systems as well.

The gas turbine engine 10 of FIG. 1 includes a low-pressure spool 28 and a high-pressure spool 30 mounted for rotation about a longitudinal centerline 32 (e.g., a rotational axis) of the gas turbine engine 10 relative to an engine static structure 34 (e.g., an engine case). The low-pressure spool 28 includes a low-pressure shaft 36 that interconnects a fan 38, a low-pressure compressor 40, and a low-pressure turbine 42. The high-pressure spool 28 includes a high-pressure shaft 44 that interconnects a high-pressure compressor 46 and a high-pressure turbine 48. It is to be understood that "low pressure" and "high pressure" or variations thereof as used herein are relative terms indicating that the high pressure is greater than the low pressure. An annular combustor 50 is disposed between the high-pressure compressor 46 and the high-pressure turbine 48 along the longitudinal centerline 32. The low-pressure shaft 36 and the high-pressure shaft 44 are concentric and rotate about the longitudinal centerline 32.

Airflow along the core flow path 26 is compressed by the low-pressure compressor 40, then the high-pressure compressor 46, mixed and burned with fuel in the combustor 50, and then expanded over the high-pressure turbine 48 and the low-pressure turbine 42. The low-pressure turbine 42 and the high-pressure turbine 48 rotationally drive the low-pressure spool 28 and the high-pressure spool 30, respectively, in response to the expansion.

Referring to FIGS. 1-4 and 4A, the gas turbine engine 10 includes a bleed system 52 which is configured to receive air and/or other fluids from a duct 54 for use in fluid systems of an associated aircraft (e.g., aircraft environmental control systems (ECS), de-icing systems, etc.) or secondary fluid systems of the gas turbine engine 10 itself. The duct 54 includes at least one duct wall 56 with defines at least a portion of a fluid flow path 58 through the duct 54. The duct 54 may be an annular duct which extends about an axial centerline 122 (e.g., the longitudinal centerline 32) and for which the at least one duct wall 56 includes an inner radial duct wall 56A and an outer radial duct wall 56B. However, the present disclosure is not limited to any particular configuration of the duct 54. The gas turbine engine 10 of FIG. 1, for example, includes the bleed system 52 in fluid communication with the duct 54 which defines a portion of the fluid flow path 58 (e.g., the bypass flow path 24 in this case) through the gas turbine engine 10. It should be understood, however, that the present disclosure is not limited to the use of the bleed system 52 with the bypass flow path 24 and the present disclosure bleed system 52 may be applicable to any bleed conduit, branched from a main duct, which experiences a tonal noise when a fluid is passing through the main duct and/or the bleed conduit.

Figure 3:
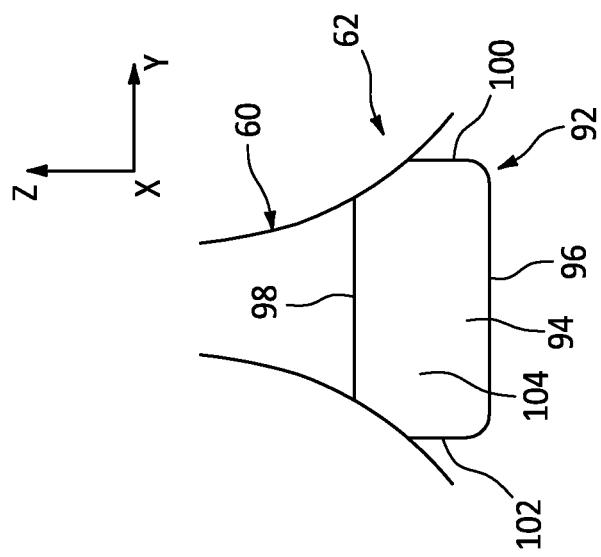
FIG. 3 illustrates a front sectional view of a portion of the bleed system of FIG. 2, in accordance with one or more embodiments of the present disclosure.
Figure 2:
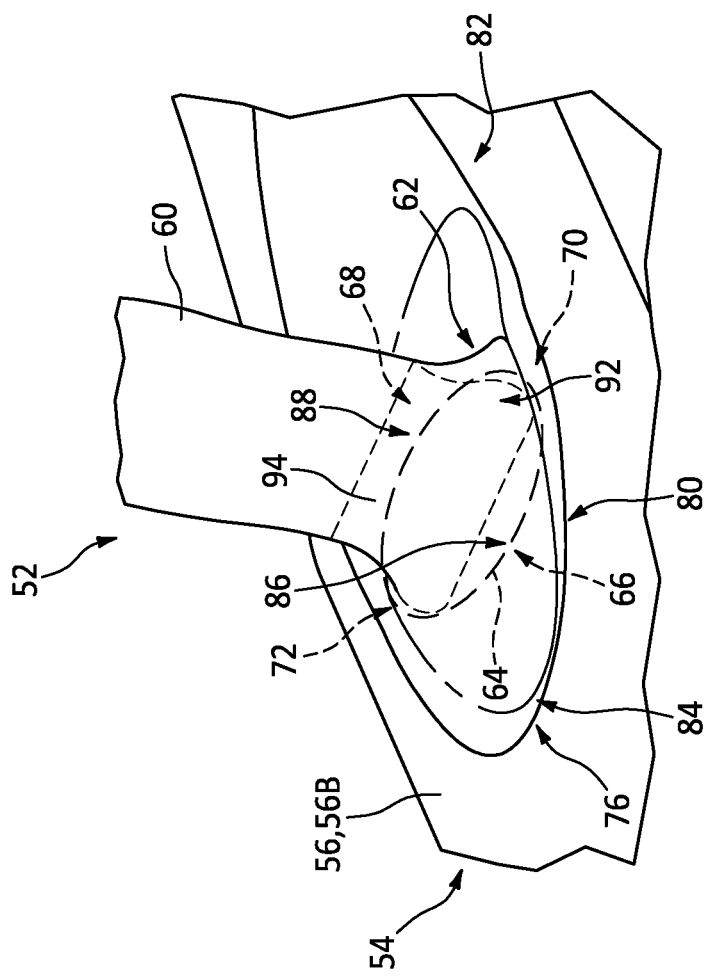
FIG. 2 illustrates perspective view of a portion of a bleed system, in accordance with one or more embodiments of the present disclosure.
Figure 4:
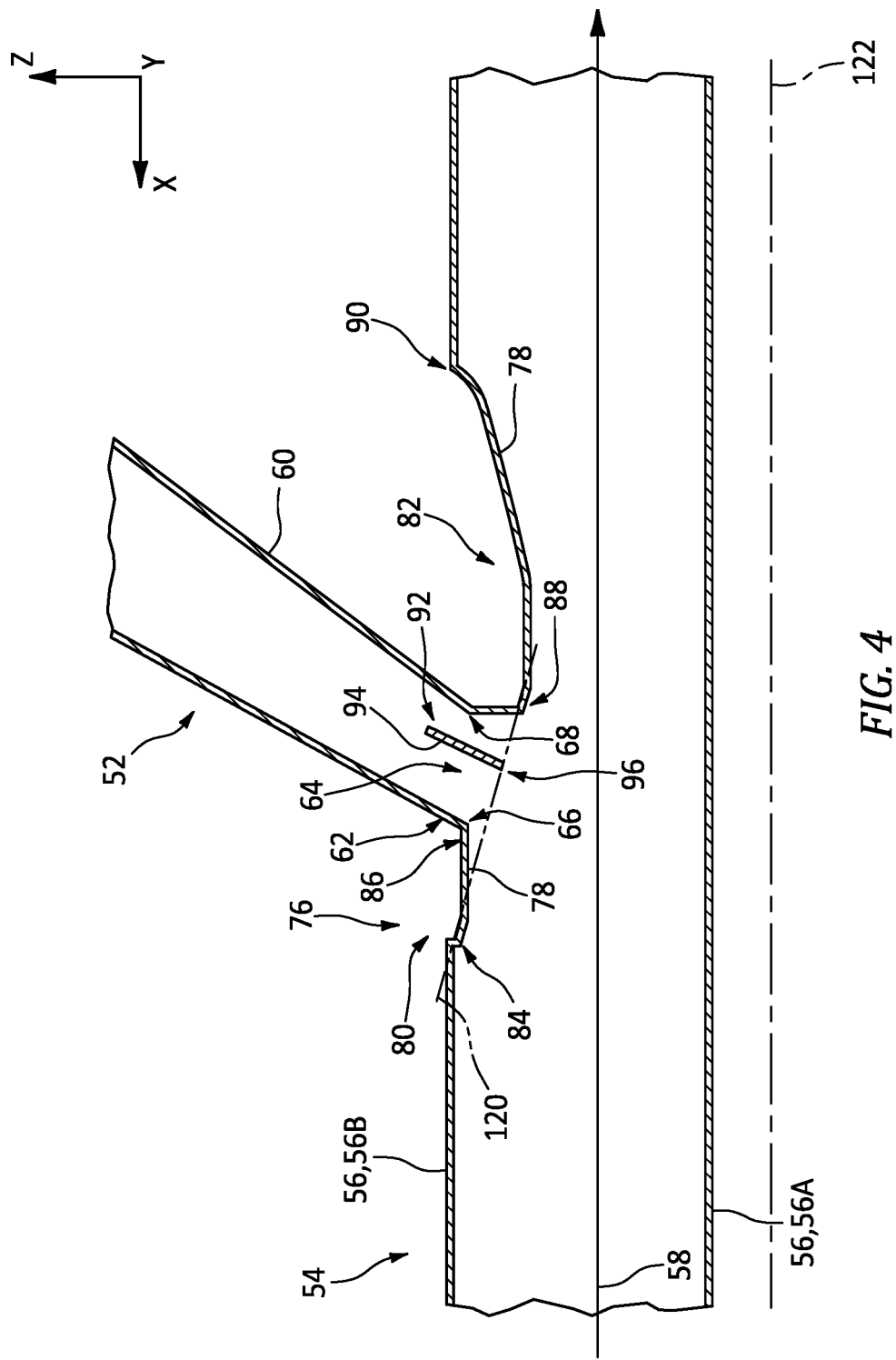
FIG. 4 illustrates a side sectional view of a portion of the bleed system of FIG. 2, in accordance with one or more embodiments of the present disclosure.

The bleed system 52 includes a bleed conduit 60. The bleed conduit 60 has an inlet 62 connected to the at least one duct wall 56 of the duct 54. The inlet 62 of the bleed conduit 60 of FIGS. 2-4 is connected to the at least one duct wall 56 such than an opening 64 in the at least one duct wall 56 is aligned with the inlet 62 of the bleed air conduit 28. The bleed conduit 60 is connected in fluid communication with the duct 54. Fluid flowing within the duct 54 along the fluid flow path 58 may be extracted (e.g., bled) from the duct 54 by the bleed conduit 60 via the opening 64. The opening 64 includes an upstream end 66 and a downstream end 68. The terms "upstream" and "downstream," as used herein, refer to positions relative to the expected direction of fluid flow through the duct 54 and/or the bleed conduit 60. The opening 64 extends in a lateral direction (e.g., along the y-axis shown in FIGS. 3 and 4) between a first lateral end 70 and a second lateral end 72, where the lateral direction is generally perpendicular to the normal direction of fluid flow along the fluid flow path 58.

The bleed system 52 further includes a bleed flow control valve 74 located within or otherwise connected to the bleed conduit 60. The bleed flow control valve 74 is disposed downstream from the inlet 62 of the bleed conduit 60. The bleed flow control valve 74 is configured to positioned in an open position and a shut position. The bleed flow control valve 74 may allow fluid flow through the bleed conduit 60 in the open position or may prevent fluid flow through the bleed conduit 60 in the shut position. The bleed flow control valve 74 may be configured for positioning in a plurality of positions between the open position and the shut position and may, therefore, be configured to effectively throttle fluid flow through the bleed conduit 60. The bleed flow control valve 74 may be configured, for example, as a butterfly valve, a globe valve, or the like. The bleed flow control valve 74 may be controlled by a solenoid or other suitable actuator which may be remotely actuated.

In some cases, flow instabilities in the vicinity of the inlet 62 may induce acoustic resonance within the duct 54 and/or the bleed conduit 60. The acoustic resonance may result in undesirable tonal noise emitted from the duct 54. Tonal noises may be particularly prominent with the bleed flow control valve 74 in the shut position or in a throttled position in which the fluid flow through the bleed conduit 60 is relatively low.

Referring to FIGS. 2-4 and 4A, the at least one duct wall 56 includes a scoop 76 which extends into the fluid flow path 58. For example, the scoop 76 may be located on the outer radial duct wall 56B and may extend radially inward into the fluid flow path 58 relative to the surrounding portions of the duct 56. The scoop 76 may be formed by the at least one duct wall 56 or may otherwise be attached to the at least one duct wall 56. For example, the scoop 76 may be a portion of the at least one duct wall 56 which is deflected into the fluid flow path 58 relative to the surrounding portions of the at least one duct wall 56.

The bleed conduit 60 is connected to the at least one duct wall 56 at the location of the scoop 76. The inlet 62 of the bleed conduit 60 of FIGS. 2 and 4 is connected to the duct 54 within the scoop 76. The inlet 62 may be positioned within the scoop 76 such that the inlet 62 is completely surrounded by the scoop 76 as shown, for example, in FIG. 2. The location of the inlet 62 of the bleed conduit 60 within the scoop 76 allows the scoop 76 to direct fluid flow from the fluid flow path 58 into the bleed conduit 60. The operation of the scoop 76 to direct fluid flow into the bleed conduit 60 has the effect of reducing fluid pressure loss of the fluid flowing through the bleed conduit 60 while having a limited impact on the fluid flowing along the fluid flow path 58.

As shown in FIG. 4, the scoop 76 includes an interior surface 78 which is deflected into the fluid flow path 58 relative to the surrounding portions of the at least one duct wall 56, as discussed above with respect to the scoop 76. The interior surface 78 of the scoop 76 is configured to guide fluid flowing along the fluid flow path 58 into the opening 64 and the inlet 62 of the bleed conduit 60. The interior surface 78 of the scoop 76 includes an upstream scoop portion 80 and a downstream scoop portion 82. The upstream scoop portion 80 is a portion of the interior surface 78 which is located upstream of the upstream end 66 of the opening 64. The upstream scoop portion 80 extends between an upstream scoop end 84 and a downstream scoop end 86. The downstream scoop end 86 may be located approximately at the position of the upstream end 66 of the opening 64. The downstream scoop portion 82 is a portion of the interior surface 78 which is located downstream of the downstream end 68 of the opening 64. The downstream scoop portion 82 extends between an upstream scoop end 88 and a downstream scoop end 90. The upstream scoop end 88 may be located at or upstream of the position of the downstream end 68 of the opening 64. The upstream scoop portion 80 of FIG. 4 has a relatively minimal deflection into the fluid flow path 58. In contrast to the upstream scoop portion 80 of FIG. 4, the downstream scoop portion 82 of FIG. 4 has a greater deflection into the fluid flow path 58, particularly at the upstream scoop end 88.

Figure 4A:
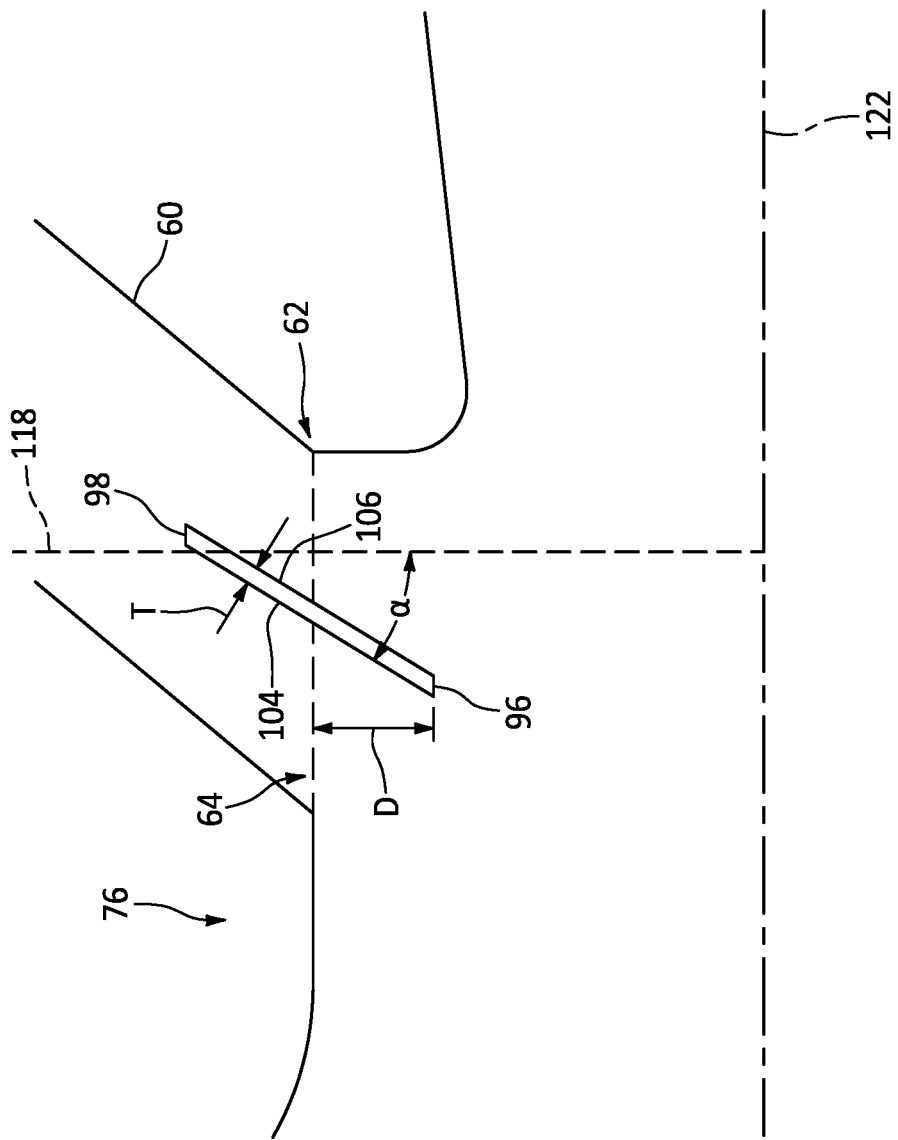
FIG. 4A illustrates an enlarged view of a portion of the bleed system of FIG. 4, in accordance with one or more embodiments of the present disclosure.

The bleed system 52 includes a louver assembly 92 disposed within the opening 64 in the at least one duct wall 56. The louver assembly 92 includes at least one louver 94. The louver 94 includes a leading edge 96 and a trailing edge 98 opposite the leading edge 96. The louver 94 further includes a first lateral end 100 and a second lateral end 102 opposite the first lateral end 100. Each of the first lateral end 100 and the second lateral end 102 extend from the leading edge 96 to the trailing edge 98. The louver 94 includes an upstream surface 104 bounded by the leading edge 96, the trailing edge 98, the first lateral end 100, and the second lateral end 102. Similarly, the louver 94 includes a downstream surface 106 bounded by the leading edge 96, the trailing edge 98, the first lateral end 100, and the second lateral end 102. As shown in FIG. 4A, the louver 94 has a thickness T extending between the upstream surface 104 and the downstream surface 106. In some embodiments, the thickness T may be greater than or equal to 0.05 inch (0.127 centimeter). For example, the thickness T may be within a range of 0.05 to 0.25 inch (0.127 to 0.635 centimeter). While the louver 94 is illustrated in FIG. 4A as having a substantially constant thickness T, the present disclosure louver 94 is not limited to this particular illustrated configuration of the louver 94 and the thickness T of the louver 94 may not be uniform throughout the louver 94. The louver 94 is mounted to the inlet 62 of the bleed conduit 60 and/or the at least one duct wall 56. For example, the louver 94 of FIGS. 2 and 3 is mounted to the bleed conduit 60 at the first lateral end 100 and the second lateral end 102 of the louver 94 such that the first lateral end 100 is positioned proximate the first lateral end 70 of the opening 64 and the second lateral end 102 is positioned proximate the second lateral end 72 of the opening 64. It should be understood, however, that the present disclosure is not limited to the mounting configuration of the louver 94 illustrated in FIGS. 2 and 3.

As shown in FIG. 4, the louver 94 is positioned with the leading edge 96 located within the fluid flow path 58 defined by the at least one duct wall 56 and the trailing edge 98 located within the bleed conduit 60. As shown in FIG. 4A, the louver 94 extends a distance D (e.g., a radial distance) into the fluid flow path 58 from the inlet 62 (identified in FIG. 4A with a dashed line) of the bleed conduit 60 to the leading edge 96. The distance D may be greater than the deflection of the upstream scoop portion 80 into the fluid flow path 58 and may be less than the deflection of the downstream scoop portion 82 into the fluid flow path 58. For example, in some embodiments, the distance D may be greater than one inch (2.54 centimeters) or, preferably, between one inch and two inches (between 2.54 and 5.08 centimeters). In some embodiments, the leading edge 96 of the louver 94 may be positioned substantially at an imaginary line 120 intersecting the upstream scoop end 84 of the upstream scoop portion 80 and the upstream scoop end 88 of the downstream scoop portion 82. The imaginary line 120 may be representative of a mean line for a sheer flow layer of the fluid flowing along the fluid flow path 58 through the duct 54 and over the opening 64.

The louver 94 may be positioned within the opening 64 at an angle α. As shown in FIG. 4A, the angle α may be defined between the upstream surface 104 of the louver 94 and a radial line (e.g., radial line 118) intersecting the upstream surface 104.

In some embodiments, the louver 94 may be substantially flat as shown in FIGS. 2 and 4. For example, the upstream surface 104 of the louver 94 may be a planar surface within the bounds of the upstream surface 104 defined by the leading edge 96, the trailing edge 98, the first lateral end 100, and the second lateral end 102. Similarly, the downstream surface 106 of the louver 94 may additionally or alternatively be a planar surface within the bounds of the upstream surface 104 defined by the leading edge 96, the trailing edge 98, the first lateral end 100, and the second lateral end 102.

Figure 5:
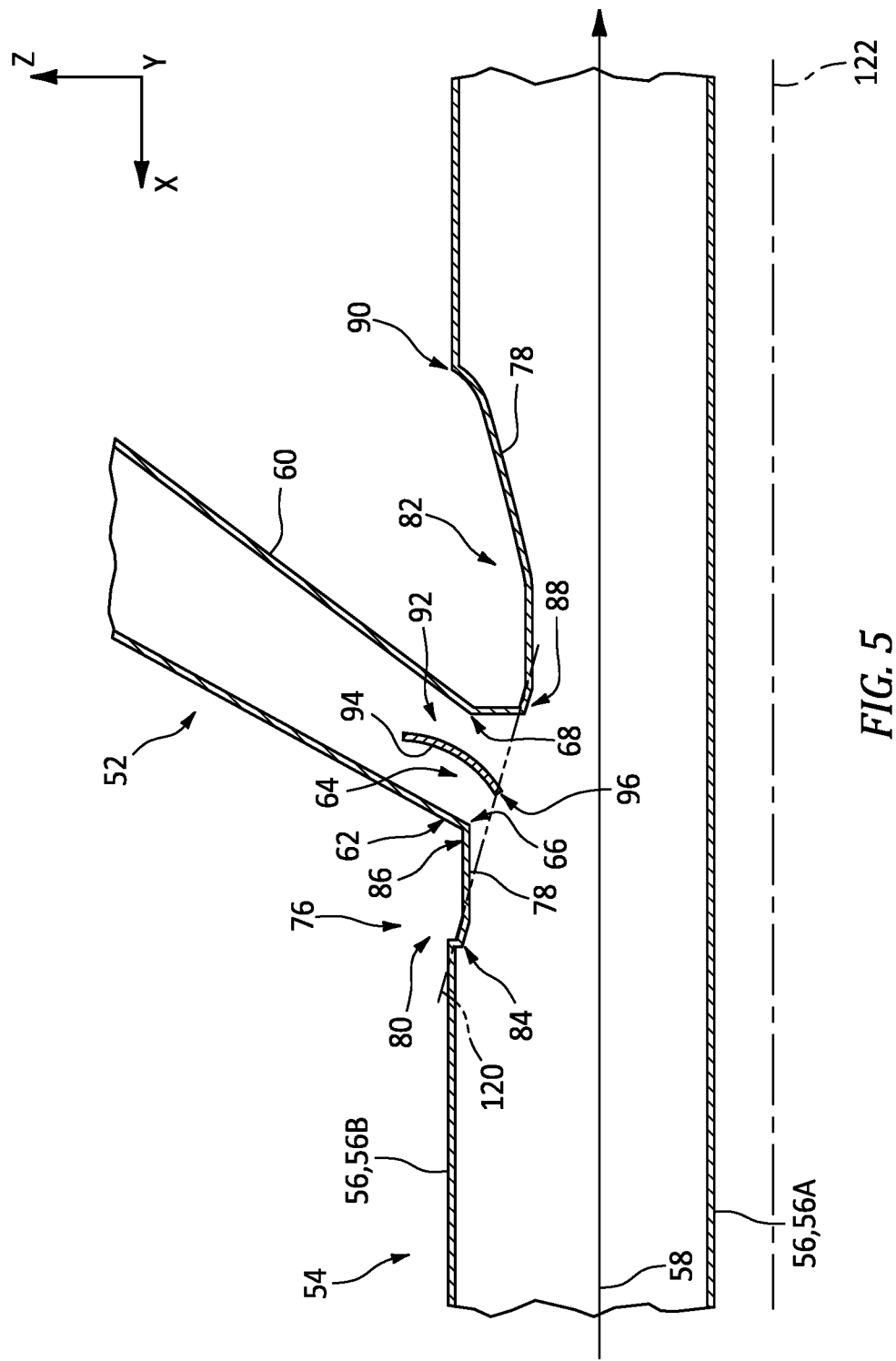
FIG. 5 illustrates a side sectional view of a portion of a bleed system, in accordance with one or more embodiments of the present disclosure.

Referring to FIG. 5, in some embodiments, the louver 94 may be curved. For example, the upstream surface 104 of the louver 94 may be curved to define a concave cross-sectional shape extending from the leading edge 96 to the trailing edge 98. Similarly, the downstream surface 106 of the louver 94 may be curved to define a convex cross-sectional shape extending from the leading edge 96 to the trailing edge 98.

Figure 6:
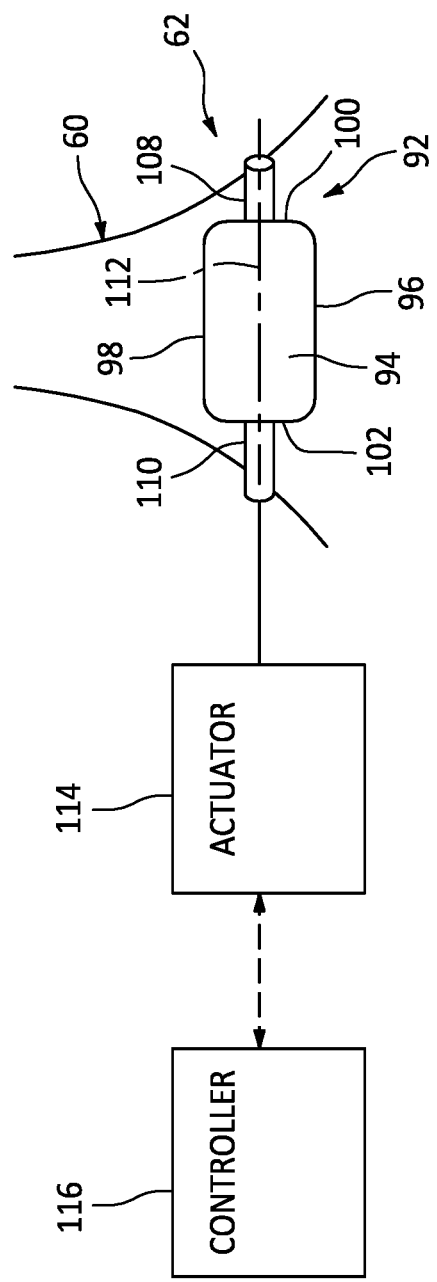
FIG. 6 illustrates a front sectional view of a portion of a bleed system, in accordance with one or more embodiments of the present disclosure.

Referring to FIG. 6, the louver 94 may be mounted to the bleed conduit 60 or the at least one duct wall 56 by a pair of opposing rods 108, 110. For example, the first lateral end 100 of the louver 94 may be mounted to the bleed conduit 60 by a first rod 108 and the second lateral end 102 of the louver 94 may be mounted to the bleed conduit 60 by a second rod 110. The rods 108, 110 may be fixedly mounted to the bleed conduit 60 or the at least one duct wall 56. Alternatively, the rods 108, 110 may be rotatably mounted to the bleed conduit 60 or the at least one duct wall 56 to allow the louver 94 to rotate about a lateral rotation axis 112 extending in a lateral direction through the rods 108, 110. The louver 94 may be configured to rotate about the lateral rotation axis 112 so as to vary the angle α (see FIG. 4A) of the louver 94. The rods 108, 110 may extend through corresponding apertures 112 in the bleed conduit 60. In some embodiments, the louver assembly 92 may include an actuator 114 operably connected to one or both of the rods 108, 110. The actuator 114 may be configured as an electric motor or another actuation device including, but not limited to, hydraulic, pneumatic, or electro-mechanical actuators, configured to impart a rotational force on the louver 94 via one or both of the rods 108, 110.

In some embodiments, the louver assembly 92 may include a controller 116. The controller 116 may be in signal communication with the actuator 114 and may be configured operate the actuator 114 to rotate the louver 94 and, thereby, control the angle α of the louver 94. The controller 116 may include any type of computing device, computational circuit, or any type of process or processing circuit capable of executing a series of instructions that are stored in memory. The controller 116 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory may represent one or more algorithms for controlling the aspects of the actuator 114, and the stored instructions are not limited to any particular form (e.g., program files, system data, buffers, drivers, utilities, system programs, etc.) provided they can be executed by the controller 116. The memory may be a non-transitory computer readable storage medium configured to store instructions that when executed by one or more processors, cause the one or more processors to perform or cause the performance of certain functions. The memory may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 116 may be achieved via the use of hardware, software, firmware, or any combination thereof. The controller 116 may also include input (e.g., a keyboard, a touch screen, etc.) and output devices (a monitor, sensor readouts, data ports, etc.) that enable the operator to input instructions, receive data, etc.

In some embodiments, the controller 116 may operate the actuator 114 to the louver 94 at predetermined values of the angle α based on one or more conditions of the gas turbine engine 10. In one non-limiting example, the controller 116 may operate the actuator 114 to position the louver 94 at a first value of the angle α in a first engine loading condition (e.g., idle) of the gas turbine engine 10. The controller 116 may additionally operate the actuator 114 to position the louver 94 at a second value of the angle α, greater than the first value, in a second engine loading condition (e.g., takeoff) of the gas turbine engine 10. Additionally or alternatively, in some embodiments, the controller 116 may be in signal communication with one or more sensors (e.g., one or more vibration sensors proximate the bleed conduit 60) and the controller 116 may operate the actuator 114 to control the angle α of the louver 94 in response to signal input from the one or more sensors.

Figure 7:
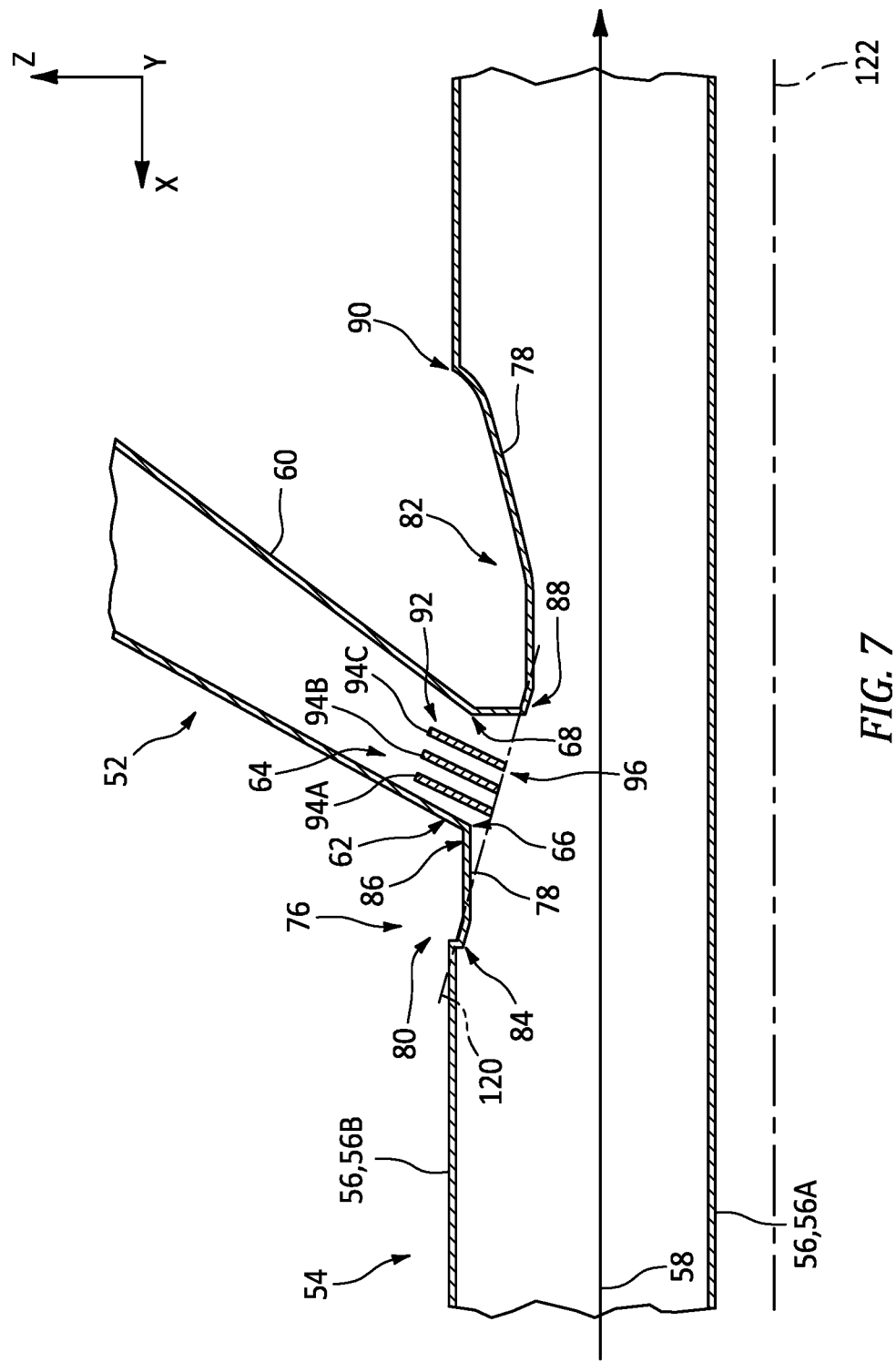
FIG. 7 illustrates a side sectional view of a portion of a bleed system, in accordance with one or more embodiments of the present disclosure.

Referring to FIG. 7, in some embodiments, the louver assembly 92 may include a plurality of louvers 94 disposed within the opening 64 in the at least one duct wall 56. Each louver 94 of the plurality of louvers 94 may be configured similar to the various embodiments of the louver 94 previously discussed. As shown in FIG. 7, for example, the plurality of louvers 94 may include a first louver 94A, a second louver 94B, and a third louver 94C arrayed in an upstream to downstream direction. While the plurality of louvers 94 shown in FIG. 7 includes three louvers, the present disclosure is not limited to any particular number of louvers in the plurality of louvers 94. As shown in FIG. 7, the louvers 94A, 94B, 94C may be mounted substantially parallel to one another. As also shown in FIG. 7, the position of the leading edge 96 of each louver 94 of the plurality of louvers 94 may be positioned substantially at the imaginary line 120 intersecting the upstream scoop end 84 of the upstream scoop portion 80 and the upstream scoop end 88 of the downstream scoop portion 82. Accordingly, the louvers 94 of the plurality of louvers 94 may extend varying distances into the fluid flow path 58 relative to one another.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A gas turbine engine comprising:
a bypass duct extending about a longitudinal centerline of the gas turbine engine, the bypass duct including at least one bypass duct wall defining at least a portion of a bypass flow path through the bypass duct, the at least one bypass duct wall forming a scoop extending into the bypass flow path relative to surrounding portions of the at least one bypass duct wall that are upstream and downstream of the scoop;
a bleed conduit including an inlet connected to the scoop of the at least one bypass duct wall, the inlet surrounded by the scoop;
and at least one louver extending between a first lateral side and a second lateral side opposite the first lateral side, each of the first lateral side and the second lateral side mounted to the bleed conduit, the at least one louver further extending between a leading edge and a trailing edge opposite the leading edge, the leading edge located within the bypass flow path and the trailing edge located within the bleed conduit;
wherein the scoop forming a portion of the bypass duct wall includes 1) an upstream scoop portion that extends into the bypass flow, the upstream scoop portion having a first upstream scoop end that is a location on the upstream scoop portion, and 2) a downstream scoop portion that extends into the bypass flow, the downstream scoop portion having a second upstream scoop end that is a location on the downstream scoop portion, wherein the upstream scoop portion is upstream of the bleed conduit and the downstream scoop portion is downstream of the bleed conduit and wherein the second upstream scoop end located on the downstream scoop portion extends a greater distance into the bypass flow than the first upstream scoop end located on the upstream scoop portion; and
wherein the leading edge of the at least one louver is positioned substantially at an imaginary line intersecting the first upstream end and the second upstream scoop end such that the leading edge extends into the bypass flow path less than second upstream scoop end.

2. The gas turbine engine of claim 1, further comprising a bleed flow control valve disposed in the bleed conduit.

3. The gas turbine engine of claim 1, wherein the at least one louver extends at least one inch into the bypass flow path from inlet.

4. The gas turbine engine of claim 1, wherein the at least one louver includes an upstream surface and a downstream surface, each of the upstream surface and the downstream surface extending from the leading edge to the trailing edge, wherein the upstream surface is a planar surface.

5. The gas turbine engine of claim 1, wherein the at least one louver includes an upstream surface and a downstream surface, each of the upstream surface and the downstream surface extending from the leading edge to the trailing edge, wherein the upstream surface is a curved surface.

6. The gas turbine engine of claim 1, wherein the first lateral side of the at least one louver is mounted to the bleed conduit by a first rod and the second lateral side of the at least one louver is mounted to the bleed conduit by a second rod.

7. The gas turbine engine of claim 6, wherein the first rod and the second rod are rotatable about a lateral rotation axis.

8. The gas turbine engine of claim 7, further comprising an actuator connected to one or both of the first rod and the second rod and configured to rotate the at least one louver about the lateral rotation axis.

9. The gas turbine engine of claim 1, wherein the at least one louver includes a plurality of louvers.

10. The gas turbine engine of claim 9, wherein the leading edge of each louver of the at least one louver is positioned substantially at the imaginary line intersecting the first upstream scoop end and the second upstream scoop end.

11. The gas turbine engine of claim 1, wherein the louver has a thickness which is greater than or equal to 0.05 inch (0.127 centimeter).

12. The gas turbine engine of claim 1, further comprising:
a combustor;
at least one compressor configured to drive air along a core flow path to the combustor, the core flow path located radially inward of the bypass flow path; and
a fan configured to drive air along the bypass flow path through the bypass duct.

13. A gas turbine engine comprising:
a duct including at least one duct wall defining at least a portion of a fluid flow path through the duct, the at least one duct wall forming an opening and a scoop, the scoop extending into the fluid flow path relative to surrounding portions of the at least one duct wall that are upstream and downstream of the scoop, the scoop surrounding the opening;
a bleed conduit, including an inlet, connected to the scoop of the at least one duct wall, the inlet surrounded by the scoop; and
at least one louver extending between a first lateral side and a second lateral side opposite the first lateral side, each of the first lateral side and the second lateral side mounted to the bleed conduit, the at least one louver further extending between a leading edge and a trailing edge opposite the leading edge, the leading edge located within the fluid flow path and the trailing edge located within the bleed conduit;
wherein the scoop forming a portion of the duct wall includes 1) an upstream scoop portion that extends into the bypass flow, the upstream scoop portion having a first upstream scoop end that is a location on the upstream scoop portion, and 2) a downstream scoop portion that extends into the bypass flow, the downstream scoop portion having a second upstream scoop end that is a location on the downstream scoop portion, wherein the upstream scoop portion is upstream of the bleed conduit and the downstream scoop portion is downstream of the bleed conduit and wherein the second upstream end located on the downstream scoop portion extends a greater distance into the bypass flow than the first upstream scoop end located on the upstream scoop portion; and
wherein the leading edge of the at least one louver is positioned substantially at an imaginary line intersecting the first upstream end and the second upstream scoop end such that the leading edge extends into the bypass flow path less than second upstream scoop end.

14. The gas turbine engine of claim 13, wherein the at least one louver includes a plurality of louvers.

15. The gas turbine engine of claim 14, wherein the leading edge of each louver of the at least one louver is positioned substantially at the imaginary line intersecting the first upstream scoop end and the second upstream scoop end.

16. The gas turbine engine of claim 13, further comprising a bleed flow control valve disposed in the bleed conduit.

* * * * *